Sept. 8, 1953     A. J. EUBANKS     2,651,526
STEERING DEVICE FOR FARM WAGONS
Filed Nov. 26, 1951     2 Sheets-Sheet 1
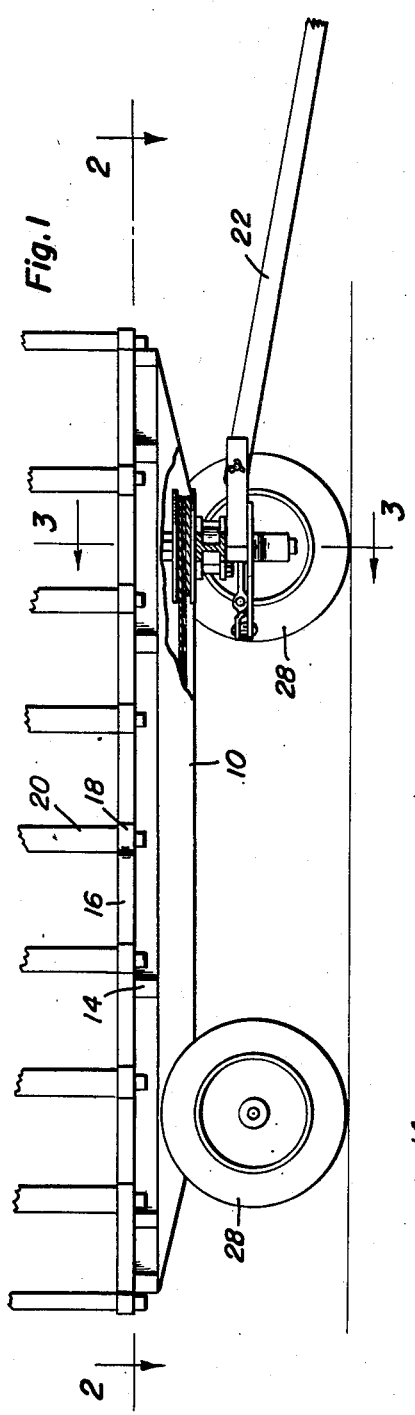
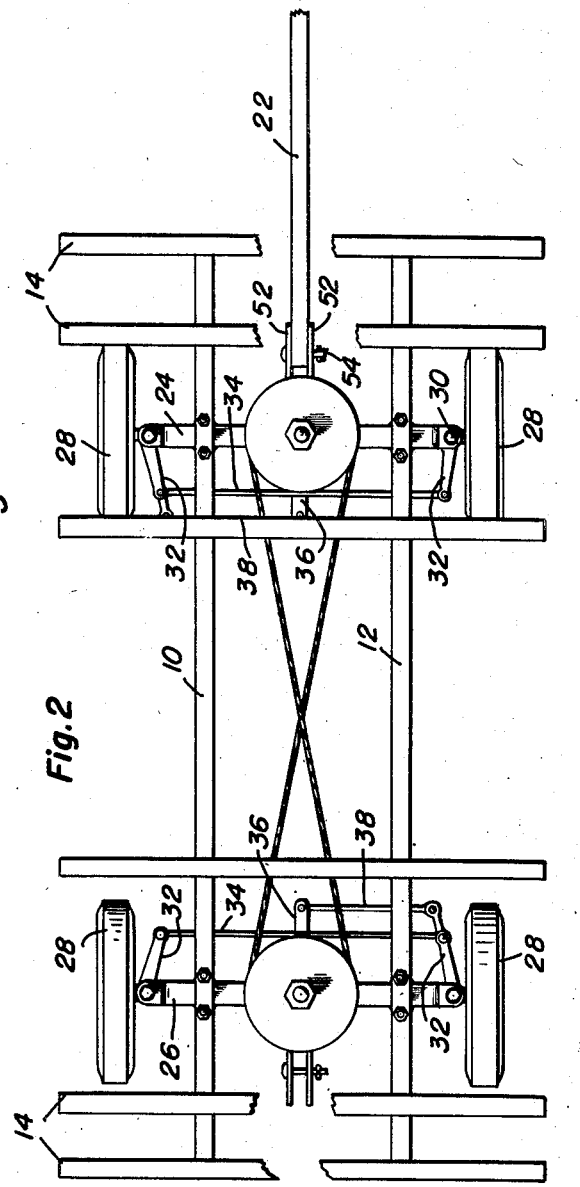
Arnold J. Eubanks
*INVENTOR.*
BY *Attorneys*

Sept. 8, 1953 A. J. EUBANKS 2,651,526
STEERING DEVICE FOR FARM WAGONS
Filed Nov. 26, 1951 2 Sheets-Sheet 2

Arnold J. Eubanks
INVENTOR.

BY *[signatures]*
Attorneys

Patented Sept. 8, 1953

2,651,526

UNITED STATES PATENT OFFICE 2,651,526

STEERING DEVICE FOR FARM WAGONS

Arnold J. Eubanks, Oakhill, Ohio

Application November 26, 1951, Serial No. 258,170

2 Claims. (Cl. 280—33.55)

This invention relates to a farm wagon having steering gear by which the rear wheels are turned in a direction opposite to the turning of the front wheels so as to obtain a correct turning of the farm wagon when it is being towed.

The primary object of this invention is the provision of a steering device for a farm wagon which will enable the rear wheels to travel in the same path as the front wheels, either when turning corners or travelling in a straight line.

Another object of this invention is to provide a farm wagon with steering gear whereby the farm wagon may be towed from either end and still enable the rear wheels to travel in the same path as the front wheels.

A further object of this invention is to provide a simple connection between the front wheels and the rear wheels for opposite turning of the rear wheels in response to the turning of the front wheels which may be easily and economically manufactured.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a front elevational view of a farm wagon having the improved steering which is the subject of this invention, with some parts removed, and other parts broken away;

Figure 2 is a horizontal sectional view taken substantially upon the plane indicated by the section line 2—2 of Figure 1, with parts being broken away;

Figure 3:
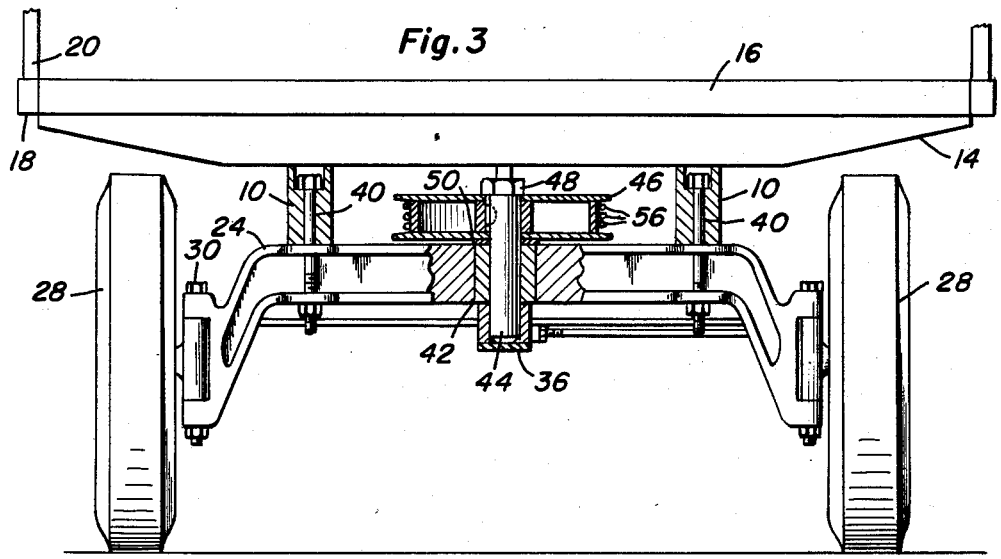
Figure 3 is a vertical sectional view taken substantially upon the plane indicated by the section line 3—3 of Figure 1 and showing the manner in which the axles and steering gear are mounted.

Referring now more specifically to the accompanying drawings, wherein like numerals designate similar parts throughout the various views, it will be seen that the embodiment of the invention depicted in the drawings as illustrative of the principles of the invention comprises a farm wagon having mounted thereon an improved steering gear.

Referring more specifically to Figure 1, it will be seen that the invention comprises a farm wagon having longitudinally extending frame side rails 10 and 12, horizontal cross-beams 14 mounted transversely of the frame rails 10 and 12 in spaced relation and secured to the upper ends thereof. Carried by the cross-beams 14 is a flat wagon-bed 16 which has mounted along the edges thereof a plurality of spaced stake pockets 18, in which are mounted stakes 20 in vertical relation. It will be noted that the forward and rear ends of the frame rails 10 and 12 are sloped outwardly to form clearance for a tow pole 22, which will be further discussed hereinafter.

Referring now to Figure 2, it will be seen that the farm wagon and its steering gear is symmetrical about a transverse center line. However, in order that the operation of the steering gear may be more easily explained, the axle to the right in Figure 2 will be referred to hereinafter as the front axle, and the axle to the left as the rear axle. Extending between and secured to the under side of the frame rails 10 and 12 are a front axle 24 and a rear axle 26. Pivotally carried at the ends of each axle are spindles on which are mounted wheels 28. Each of the wheel spindles are connected to the ends of the axles by conventional king pins 30. The spindles are each further provided with link arms 32. Drag links 34 extend between and are secured to the link arms 32 of the wheels of each axle to maintain the wheels 28 of each axle in parallel relation. A combined steering and towing member 36 is pivotally carried by each of the axles 24 and 26. A drag link 38 extends between and is pivotally connected to the arm of one wheel of each axle and its associated steering and towing member 36, whereby, when the steering and towing member is pivoted with respect to the axle, the drag link 38 is moved transversely of the farm wagon and causes the wheels 28 to be pivoted with respect to the axles.

As is clearly shown in Figure 3, the axles are secured transversely of and to the underside of the frame rails 10 and 12 by bolts 40 which extend through the frame rails and the axles to rigidly secure the same together.

While the specific connection between the axles and the frame rails has been illustrated, it is readily apparent that other types of conventional connections may be utilized between the frame rails and the axles. Also, as shown in Figure 3, the axles are of the dropped type in order to provide the necessary clearance between the wheels and the frame of the wagon. However, it is obvious that the axle may be of any conventional construction.

The axles 24 and 26 are each provided with a centrally located sleeve bushing 42. The steering and towing members 36 each has a pivot pin rigidly secured thereto intermediate their ends, the pivot pin being designated as 44 and extending upwardly through the bushing 42 in the axle. Mounted on and keyed to the upper end of each pivot pin 44 is a pulley member 46. The pivot pins 44 have threaded upper ends which carry nuts 48 which retain the pulley members 46 on the pivot pins 44. Disposed between the lower surfaces of the pulley members 46 and the upper surfaces of the axles are thrust washers 50.

Figure 4:
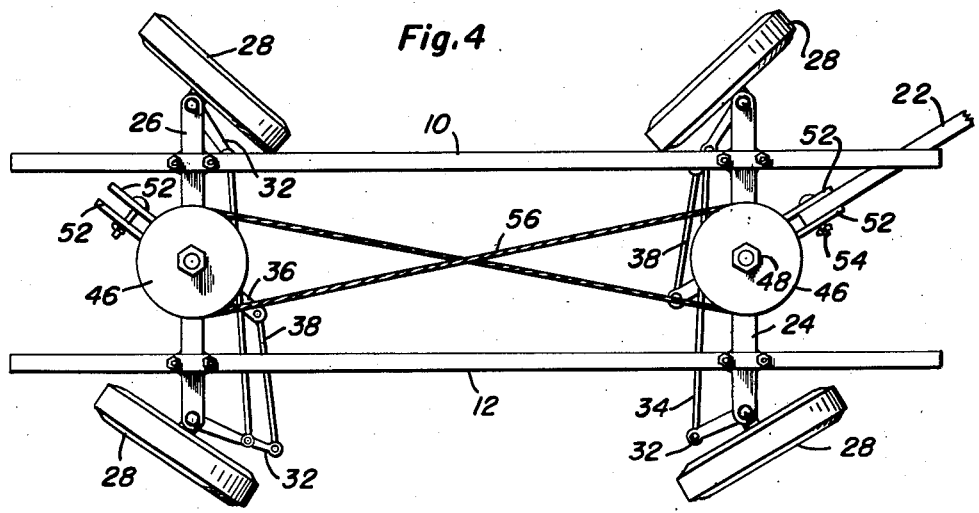
Figure 4 is a horizontal sectional view similar to Figure 2, the cross-beams being omitted and the wheels being shown in a turned position.

Referring now to Figures 2 and 4, it will be seen that the steering and towing members 36 have, at their ends opposite to the drag link connection a pair of spaced plates 52. The tow pole 22 is disposed between the pair of plates 52 and the front steering and towing member 36 and pivotally secured thereto by a fastener 54. Extending between and looped around the pulley members 46 are one or more endless flexible connecting members 56 which are looped in the form of a figure eight whereby clockwise rotation of one pulley member 46 will result in counter-clockwise rotation of the other pulley member 46. As shown in Figure 4, when the towing vehicle (not shown) turns to the left, the tow pole 22 also moves to the left, thereby rotating the front towing steering member 36 to the left. Since the pulley member 46 is rigidly attached to the steering and towing member 36, it follows that the front pulley member 46 will be rotated counter-clockwise. Also, the front drag link 38 will be moved to the right with the resultant turning of the front wheels to the left. The counter-clockwise rotation of the front pulley member 46 will cause movement of the flexible connecting members 56 with the resultant clockwise rotation of the rear pulley member 46. The clockwise rotation of the rear pulley member 46 will result in likewise clockwise rotation of the steering and towing member 36 which in turn will move the drag link 38 to the right. Movement of the drag link 38 to the right will cause movement of the wheels to the right. It is readily apparent that since the front wheels turn to the left and the rear wheels turn to the right that the rear wheels will follow in the tracks of the front wheels either along a straight course or during a turn.

While the connecting member 56 has been illustrated and heretofore described as broadly a flexible member, it is pointed out that the connecting member 56 must be in non-slipping engagement with the pulley members 46. The flexible members 56 may be ropes, steel cables, chains, etc. which have projections thereon which are engageable in non-slipping relation to the pulley members 46 which may be provided with a roughened surface or lugs for engaging the same.

From the foregoing, the construction and operation of the device will be readily understood and further explanation is believed to be unnecessary.

However, since numerous modifications and changes will readily occur to those skilled in the art, it is not desired to limit the invention to the exact construction shown and described, and, accordingly, all suitable modifications and equivalents may be resorted to, falling within the scope of the appended claims.

Having described the invention, what is claimed as new is:

1. A running gear unit for a land vehicle comprising front and rear axles, wheels pivotally secured to the ends of each axle, arms carried by a spindle of each wheel, tie rods between the wheels of each axle, combined steering and towing members pivotally mounted on each axle by a pivot pin, drag links carried at one end of each steering and towing member, the drag links being connected to one wheel of each axle, pulley members carried by said pivot pins and rigidly secured to said steering and towing arms, a resilient member extending between and around said pulley members for turning of said rear wheels in response to the turning of said front wheels, said flexible member being endless and looped in the form of a figure eight and attached to said pulley members in non-slipping engagement, whereby said rear wheels are turned in an opposite direction from said front wheels.

2. A running gear unit for a land vehicle comprising front and rear axles, wheels pivotally carried at opposite ends of each axle, tie rods extending between and connecting the wheels of each axle, a central pivot pin extending vertically through each axle and rotatably journaled therein, a combined towing and steering member rigidly secured to the lower end of each pivot pin below its respective axle, a steering arm coextensive with said combined towing and steering member and extending in an opposite direction, a drag link connecting one wheel of each axle to the associated steering arm, a pulley member rigidly secured to the upper end of each pivot pin above its respective axle, a resilient member extending between and around said pulley members for turning said rear wheels in response to turning of said front wheels, said flexible member being endless and looped in the form of a figure eight and attached to said pulley members in non-slipping engagement, whereby said rear wheels are turned in a direction opposite from said front wheels.

ARNOLD J. EUBANKS.

References Cited in the file of this patent

UNITED STATES PATENTS

| Number | Name | Date |
| --- | --- | --- |
| 646,563 | Smithson et al. | Apr. 3, 1900 |
| 891,205 | Campbell | June 16, 1908 |
| 2,251,584 | Fageol et al. | Aug. 5, 1941 |

FOREIGN PATENTS

| Number | Country | Date |
| --- | --- | --- |
| 5,983 | Great Britain | Sept. 13, 1906 |